(12) United States Patent
Terada et al.

(10) Patent No.: US 7,582,713 B2
(45) Date of Patent: Sep. 1, 2009

(54) ION EXCHANGE POLYMER DISPERSION, PROCESS FOR ITS PRODUCTION AND ITS USE

(75) Inventors: Ichiro Terada, Kanagawa (JP); Satoru Hommura, Kanagawa (JP); Nobuyuki Kasahara, Kanagawa (JP); Katsuya Ueno, Kanagawa (JP)

(73) Assignee: Asahi Glass Company, Limited, Tokyo (JP)

(*) Notice: Subject to any disclaimer, the term of this patent is extended or adjusted under 35 U.S.C. 154(b) by 286 days.

(21) Appl. No.: 11/030,295

(22) Filed: Jan. 7, 2005

(65) Prior Publication Data

US 2005/0143540 A1 Jun. 30, 2005

Related U.S. Application Data

(63) Continuation of application No. PCT/JP03/08658, filed on Jul. 8, 2003.

(30) Foreign Application Priority Data

Jul. 8, 2002 (JP) .............................. 2002-198931

(51) Int. Cl.
*C08F 12/30* (2006.01)
(52) U.S. Cl. ............... 526/243; 428/195.1; 429/33; 521/27; 523/160; 526/240
(58) Field of Classification Search ............. 526/243, 526/240; 523/160; 521/27; 429/33; 428/195.1
See application file for complete search history.

(56) References Cited

U.S. PATENT DOCUMENTS

| 6,080,501 A * | 6/2000 | Kelley et al. ............. 429/31 |
| 2003/0008198 A1 * | 1/2003 | Mukoyama et al. ........ 429/42 |
| 2003/0013774 A1 * | 1/2003 | Mukoyama et al. ........ 521/27 |
| 2003/0023015 A1 * | 1/2003 | Tatemoto et al. .......... 526/243 |
| 2005/0143540 A1 | 6/2005 | Terada et al. |

FOREIGN PATENT DOCUMENTS

| EP | 0 718 903 A1 | 6/1996 |
| EP | 718903 A1 * | 6/1996 |
| EP | 718903 A1 * | 8/1996 |
| EP | 1263073 A1 * | 12/2002 |
| EP | 1535950 A1 * | 6/2005 |
| JP | 61-40267 | 9/1986 |
| JP | 6-44982 | 2/1994 |
| JP | 2781630 | 5/1998 |
| JP | 2001-81261 | 3/2001 |
| WO | WO 98/11614 | 3/1998 |
| WO | WO-98/11614 * | 3/1998 |

OTHER PUBLICATIONS

R.B. Moore, et al., "Procedure for Preparing Solution-Cast Perfluorosulfonate Ionomer Films and Membranes", Anal. Chem., 58, 1986, pp. 2569-2570.
P. Aldebert, et al., "Rod Like Micellar Structures in Perfluorinated Ionomer Solutions", J. Phys. France, 49, Dec. 1988, pp. 2101-2109.
P.A. Cirkel, et al., "Equilibrium Aggregation in Perfluorinated Ionomer Solutions", Macromolecules, vol. 32, No. 2, 1999, pp. 531-533.
S. Jiang, et al., "Effect of Additives on Self-Assembling Behavior of Nafion in Aqueous Media", Macromolecules, vol. 34, No. 22, 2001, pp. 7783-7788.
U.S. Appl. No. 11/271,915, filed Nov. 14, 2005, Kasahara, et al.
U.S. Appl. No. 11/315,016, filed Dec. 23, 2005, Tanuma.

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, P.C.

(57) ABSTRACT

A thickened ion exchange polymer dispersion is obtained by applying ultrasonic vibration or a shearing force to an ion exchange polymer dispersion having a fluorinated polymer having sulfonic acid groups as an ion exchange polymer uniformly dispersed in a dispersion medium so that the viscosity of the dispersion at 25° C. at a shear rate of 10 (1/s) increases 2-2000 times in a thickening step. When formed into a membrane, the dispersion can forms an ion exchange membrane having a uniform and small thickness, high strength, which is free from cracking and shows constant swelling in water and steam. Further, a layer formed by applying a coating solution containing this dispersion and a catalyst powder comprising catalyst metal particles and a carbon support loaded with the catalyst metal particles to a substrate can be used to prepare a membrane-electrode assembly as a catalyst layer for at least one of the cathode and the anode by providing the catalyst layer adjacently to an ion exchange membrane. Because the catalyst layer is highly strong, has few defects and is excellently smooth, a high-performance membrane-electrode assembly for solid polymer electrolyte fuel cells can be obtained.

9 Claims, No Drawings

ION EXCHANGE POLYMER DISPERSION, PROCESS FOR ITS PRODUCTION AND ITS USE

TECHNICAL FIELD

The present invention relates to an ion exchange polymer dispersion, a process for its production, a process for producing an ion exchange membrane made of the ion exchange polymer and a process for producing a membrane-electrode assembly for solid polymer electrolyte fuel cells prepared by using the ion exchange polymer.

BACKGROUND ART

The hydrogen-oxygen fuel cell receives attention as a power generating system having little adverse effect on the global environment because in principle, its reaction product is water only. Solid polymer electrolyte fuel cells were once mounted on spaceships in the Gemini project and the Biosatellite project, but their power densities at the time were low. Later, more efficient alkaline fuel cells were developed and have dominated the fuel cell applications in space including space shuttles in current use.

Meanwhile, with the recent technological progress, solid polymer fuel cells are drawing attention again for the following two reasons: (1) the development of highly ion-conductive membranes for use as solid polymer electrolytes and (2) the impartment of high activity to the catalysts for use in gas diffusion electrodes by the use of carbon as the support and an ion exchange resin coating.

For improved performance and low cost, the electric resistance can be reduced through reduction in thickness of a solid polymer electrolyte membrane. Solid polymer electrolyte membranes, which are usually obtained by using a polymer having sulfonic acid groups, can be reduced in thickness by the following two methods. (1) Heat extrusion of a polymer having precursors of sulfonic acid groups ($SO_2F$ groups or $SO_2Cl$ groups) into a thin membrane, followed by hydrolysis of the precursors and conversions of the precursors into the acid form by acid treatment. (2) Casting of a uniform dispersion of a polymer having sulfonic acid groups in a dispersion medium such as an alcohol on a support such as a polyester film followed by drying.

However, the method (1) has a minimum limit on the thickness of obtainable membranes because thin membranes are difficult to handle during hydrolysis and acid treatment. Further, because the hydrolysis and the acid treatment cannot be carried out successively at a high rate, the method is disadvantageous in terms of cost. On the other hand, the method (2) is advantageous in terms of cost because there is no minimum limit on the thickness of obtainable membranes, and the polymer can be subjected to the hydrolysis and the acid treatment in large batches before the uniform dispersion is cast into membranes.

Accordingly, use of a thin membrane obtained by casting as in (2) in a membrane-electrode assembly for solid polymer electrolyte fuel cells was proposed (JP-A-6-44982). However, thin membranes obtained by this method have defects such as low strength, vulnerability to cracking, and change in swelling in water or steam with time, presumably, though not precisely, because the dispersion of the polymer having sulfonic acid groups has a structure having micelles of the polymer dispersed in the dispersion (JP-B-61-40267).

In order to solve these defects, addition of triethyl phosphate, dimethyl sufoxide or 2-ethoxyethanol to a polymer dispersion (JP-A-61-40267) and addition of N,N-dimethylformamide or ethylene glycol were proposed (Anal. Chem., 58, 2570 (1986)).

However, in these methods, because a solvent having a relatively high boiling point is added, a residue of the solvent remains in a membrane cast at a low temperature, or casting requires a long time or a high temperature not to leave a residue of the solvent. Accordingly, there is a problem with production efficiency.

Another possible approach is mere heat treatment at a temperature higher than the glass transition temperature of an ion exchange polymer without addition of a solvent having a high boiling point, and heat treatment of a membrane-electrode assembly made of an electrolyte membrane and electrodes bonded together at a temperature of from 130 to 270° C. was proposed (Japanese Patent 2781630). However, there was a problem that burning of a residual solvent which can occur at an elevated temperature in the presence of the catalyst deteriorates the performance.

DISCLOSURE OF THE INVENTION

Accordingly, the object of the present invention is to provide an ion exchange polymer dispersion for formation of an ion exchange membrane having a uniform and small thickness, high strength, which is free from cracking and shows constant swelling in water or steam, a process for its production and a process for producing an ion exchange membrane. Further, another object of the present invention is to obtain a membrane-electrode assembly for solid polymer electrolyte fuel cells having smooth catalyst layers with few defects and excellent smoothness by using such an ion exchange polymer dispersion.

The present invention provides a process for producing an ion exchange polymer dispersion which comprises a thickening step of thickening an ion exchange polymer dispersion A having a fluorinated polymer having sulfonic acid groups as an ion exchange polymer uniformly dispersed in a dispersion medium into an ion exchange polymer dispersion B by applying ultrasonic vibration or a shearing force to the dispersion A so that the viscosity of the dispersion A at 25° C. at a shear rate of 10 (1/s) increases 2-2000 times.

Further, the present invention provides an ion exchange polymer dispersion having a fluorinated polymer having sulfonic acid groups as an ion exchange polymer uniformly dispersed in a dispersion medium, which has a viscosity of from 1000 to 100000 mPa·s at 25° C. at a shear rate of 10 (1/s).

Further, the present invention provides a process for producing an ion exchange membrane which comprises forming the ion exchange polymer dispersion produced by the above process into a membrane.

Further, the present invention provides a process for producing a membrane-electrode assembly for solid polymer electrolyte fuel cells which comprises a cathode and an anode each having a catalyst layer containing an ion exchange polymer and a catalyst powder comprising catalyst metal particles and a carbon support loaded with the catalyst metal particles, and a polymer electrolyte membrane interposed between the cathode and the anode, said process comprising thickening an ion exchange polymer dispersion A having a fluorinated polymer having sulfonic acid groups as an ion exchange polymer uniformly dispersed in a dispersion medium into an ion exchange polymer dispersion B by applying ultrasonic vibration or a shearing force to the dispersion A so that the viscosity of the dispersion A at 25° C. at a shear rate of 10 (1/s) increases 2-2000 times; preparing a coating solution containing the ion exchange polymer dispersion B and the catalyst powder comprising catalyst metal particles and a carbon support loaded with the catalyst metal particles; coating a substrate with the coating solution to form a layer; and providing the layer adjacently to the polymer electrolyte membrane as the catalyst layer for at least one of the cathode and the anode.

The process for producing an ion exchange polymer dispersion by thickening of the present invention ensures that the ion exchange polymer entangles sufficiently in the dispersion. It is reported that an ion exchange polymer generally disperses in a dispersion medium in the form of discrete micelles (J. Phys. France, 49, 2101 (1988), Macromolecules, 32, 531 (1999), Macromolecules, 34, 7783 (2001)). When cast into a membrane at a relatively low temperature, such a solution forms a weak membrane vulnerable to cracking in which micelles are fused.

On the other hand, in the dispersion obtained by the process of the present invention, the ion exchange polymer is entangled sufficiently by virtue of the application of external forces such as ultrasonic vibration and a shearing force. Accordingly, if this dispersion is formed into a membrane, it forms a membrane having high strengths such as tensile and tearing strengths which is resistant to cracking. Further, it was reported that when a thick ion exchange polymer dispersion is supplemented with the dispersion medium and stirred with an ordinary stirrer, the viscosity increases from a low initial value as the initially inhomogeneous dispersion approaches homogeneity (JP-B-61-40267). However, this is a phenomenon observed during homogenization of a dispersion with the dispersion medium added as the diluent, and is essentially different from the phenomenon which accounts for sufficient entanglement of the ion exchange polymers of the present application.

Further, the dispersion obtained by the present invention can be used for forming an electrode of a membrane-electrode assembly for solid polymer electrolyte fuel cells after mixed with a catalyst powder. Namely, a smooth and uniform electrode containing an ion exchange polymer having a high strength can be obtained by using a mixture of the dispersion and a catalyst powder.

MODE FOR CARRYING OUT THE INVENTION

The process of the present invention will be described in detail. In the present invention, an ion exchange polymer dispersion A having a fluorinated polymer having sulfonic acid groups as an ion exchange polymer uniformly dispersed in a dispersion medium is thickened into an ion exchange polymer dispersion B in the thickening step by applying ultrasonic vibration or a shearing force to the dispersion A so that the viscosity of the dispersion A at 25° C. at a shear rate of 10 (1/s) increases 2-2000 times. In the specification, for convenience of explanation, the dispersion before the thickening step is referred to the dispersion A, and the dispersion after the thickening step is referred to the dispersion B.

The thickening step is preferably carried out at a temperature of from 30 to 100° C. If the temperature is lower than 30° C., the viscosity is unlikely to sufficiently increase, and if the temperature is higher than 100° C., the composition tends to change because the dispersion medium evaporates. The temperature is particularly preferably from 40 to 80° C. because the viscosity increases sufficiently with little change in the composition.

When ultrasonic vibration is applied in the thickening step, the energy given to the dispersion A is preferably from 0.01 to 10 kWh per 1 kg of unit mass of the dispersion A. The energy given to the dispersion A is represented by power (kWh)×treatment time (h)/the mass of the dispersion to be treated (kg). If the energy is less than 0.01 kWh, the viscosity does not tend to increase sufficiently, and if it is larger than 10 kWh, the viscosity tends to increase abruptly. The energy is preferably from 0.05 to 1 kWh because the viscosity moderately increases and is easy to control.

The ultrasonic power is preferably from 30 to 2,000 W. If the power is less than 30 W, it takes long time to increase the viscosity, or the viscosity is unlikely to increase sufficiently because the external force applied to the dispersion A is too small. On the other hand, if the power is larger than 2,000 W, the external force applied is so large that the viscosity increases abruptly, and heat is generated so much that change in the composition of the dispersion medium tends to be too remarkable to control. The power is preferably from 300 to 900 W because the viscosity increases moderately with controllable heat generation.

In the case of ultrasonic vibration, the diameter of the tip is preferably from 5 to 50 mmΦ, though it varies with the amount of the dispersion to be treated. If the diameter is smaller than 5 mmΦ, the efficiency is low because the dispersion can be treated only in small batches. On the other hand, even if the diameter is larger than 50 mmΦ, increase in the efficiency is not commensurate with increase in the cost of the tip. Further, because very little energy is given to the dispersion where the distance from the tip is large, a small vessel is preferably used so as to surround the tip, while the dispersion is continuously passed several times or circulated through the vessel to secure uniform treatment.

In this case, the volume of the vessel is preferably from 30 to 200 ml, and the flow rate is preferably from 10 to 2,000 ml/min. It is not preferred that the volume of the vessel is less than 30 ml or the flow rate is less than 10 ml/min, because the throughput speed is low. If the vessel volume is larger than 200 ml or the flow rate is higher than 2,000 ml/min, the viscosity is unlikely to increase sufficiently due to insufficient treatment.

Further, in the present invention, the shearing force may be applied by high speed rotation using a homogenizer, a homomixer, a high-speed jet flow system, a grinder, etc., or by extrusion of the dispersion through a narrow path under high pressure using a high-pressure emulsifier, so that a high shearing force is exerted as stated above in at least one part of the apparatus. If the shearing force is applied by high-speed rotation, the shear rate is preferably from $10^2$ to $10^8$ (1/s). The shear rate is defined as shear rate (1/s)=peripheral speed (m/s)/clearance at a sheared portion (m). Here, the peripheral speed is represented by peripheral speed (m/s)=2Π×radius of gyration (m)×number of rotations (1/s), and the number of rotations is the number of rotations per one second. The clearance at a sheared portion refers to the length of a clearance between the rotor and the vessel where a shearing force is applied.

If the shear rate is less than $10^2$ (1/s), the viscosity does not tend to increase sufficiently. Further, if it is more than $10^8$ (1/s), the viscosity tends to increase abruptly. The shear rate is particularly preferably from $10^3$ to $10^7$ (1/s), further preferably from $10^5$ to $10^7$ (1/s) for moderate viscosity increase and easy control. Further, the energy (J) given to 1 kg of unit mass of the dispersion A can be represented below.

Energy (J)=shearing force (N)×shear distance (m),
shearing force (N)=shearing stress (Pa)×shear area (m$^2$),
shearing stress (Pa)=shear rate (1/s)×dispersion viscosity (Pa·s),
shear distance (m)=2Π×radius of gyration (m)×number of rotations (1/s)×retention time (s).

It is preferred to give from $10^3$ to $10^8$ J of energy to the dispersion A per 1 kg of unit mass of the dispersion A by shearing, while setting the shear rate within the above range. If the energy is less than $10^3$ J, the viscosity of the dispersion A is unfavorably unlikely to increase sufficiently. Further, if the energy is more than $10^8$ J, the viscosity unfavorably tends to increase abruptly. The energy is preferably from $10^4$ to $10^7$ J for moderate viscosity increase and easy control. Further, even if the shear rate is below the range, the energy given to the dispersion A can be increased by extending the retention time. However, no matter how much the dispersion is sheared at a low shear rate, the viscosity of the dispersion does not increase.

At the time of application of the shearing force by high-speed rotation, the number of rotations is preferably from 1,000 to 50,000 rpm. If the number of rotations is smaller than 1,000 rpm, the dispersion does not increase in viscosity sufficiently due to insufficient external force exerted on the dispersion, and as a result, is unlikely to form a strong membrane by casting. On the other hand, if the number of rotations is larger than 50,000 rpm, the control will be difficult because the viscosity increases abruptly due to exertion of too large external force, and heat is generated so much that change in the composition of the dispersion medium tends to be too remarkable to control. The number of rotations is preferably from 3,000 to 30,000 rpm because the viscosity increases moderately with time, with little heat generation.

When the shearing force is applied by a homogenizer or a homomixer, the dispersion becomes less homogeneous as the viscosity increase, and therefore, it is preferred to stir the dispersion throughout at a low speed simultaneously. When a shear is applied by a grinder, silicon carbide or alumina, which can apply a shear even to a flexible material, is preferably used as the material for the grinder. The clearance of the grinder is preferably from 10 to 80 μm. If the clearance is less than 10 μm, the shearing force is so strong that heat is generated too much to control. If it is more than 80 μm, the shearing force is unlikely to be applied enough to increase the viscosity sufficiently. It is also possible to pass several times or circulate the dispersion through a grinder to obtain the present dispersion.

In the present invention, the viscosity of the dispersion at 25° C. at a shear rate of 10 (1/s) is increased 2-2,000 times in the thickening step. Namely, the viscosity of the dispersion B is 2-2,000 times larger than the viscosity of the dispersion A. If the viscosity is increased less than twice, the viscosity increase does not have much effect, and therefore the dispersion forms insufficiently strong membranes. If the viscosity is increased more than 2,000 times, the viscosity becomes so high that formation of membranes is difficult. The viscosity is preferably increased 10-200 times because the strengthening effect is large, and the processability is good.

The viscosity of the dispersion A becomes not so high by stirring the dispersion A simply. Take a commercially available Nafion solution (manufactured by Aldrich), which is a dispersion of a fluorinated polymer having sulfonic acid groups in water and an alcohol having a solid content of 5% in terms of the mass ratio to the total mass of the dispersion and a viscosity of 10 mPa·s at 25° C. at a shear rate of 10 (1/s), for example. Even when the solution is stirred for 2 hours at 250 rpm, the viscosity remains at 10 mPa·s and does not increase. In order to increase the viscosity twice or more, application of ultrasonic vibration or a shearing force is required as mentioned above.

The dispersion medium in the dispersion of the present invention is not particularly limited, but particularly preferably contains an alcohol such as those mentioned below.

Monohydric alcohols such as methyl alcohol, ethyl alcohol, n-propyl alcohol, n-butyl alcohol and isopropyl alcohol. Polyhydric alcohols such as ethylene glycol, propylene glycol and glycerin.

These alcohols may be used singly, in combination of at least two or in combination with water or additional dispersion media. The additional dispersion media are not particularly limited and are exemplified below.

Fluorinated alcohols such as 2,2,2-trifluoroethanol, 2,2,3,3,3-pentafluoro-1-propanol, 2,2,3,3-tetrafluoro-1-propanol, 2,2,3,4,4,4-hexafluoro-1-butanol, 2,2,3,3,4,4,4-heptafluoro-1-butanol and 1,1,1,3,3,3-hexafluoro-2-propanol.

Oxygen- or nitrogen-containing perfluoro compounds such as perfluorotributylamine and perfluoro-2-n-butyltetrahydrofuran, chlorofluorocarbons such as 1,1,2-trichloro-1,2,2-trifluoroethane, hydrochlorofluorocarbons such as 3,3-dichloro-1,1,1,2,2-pentafluoropropane and 1,3-dichloro-1,1,2,2,3-pentafluoropropane, and polar solvents such as N,N-dimethylformamide, N,N-dimethylacetamide, dimethyl sulfoxide and water may be used.

These dispersion media may be used singly or in combination of at least two.

In the present invention, the thickening step may be preceded by a filtration step of filtering the dispersion for removal of coarse particles because a trace amount of the fluorinated polymer having sulfonic acid groups as an ion exchange polymer may remain dispersed ununiformly in the dispersion of the polymer in a dispersion medium, and removal of the trace amount of the polymer is preferred. It is not preferred, though possible, that filtration follows the thickening step, because the dispersion has a high viscosity after the thickening step and is filtered quite inefficiently. The filter to be used in the filtrating step preferably has a pore diameter of from 0.5 to 30 μm. A filter having a pore diameter of less than 0.5 μm is undesirable because the filtration efficiency is low. A filter having a pore diameter of more than 30 μm is also undesirable because uneven agglomerates are not filtered off sufficiently.

Further, in the present invention, the thickening step may be preceded by a concentration adjusting step to adjust the concentration of the ion exchange polymer in the dispersion. When the concentration of the dispersion A before the thickening step is so high that the thickening step cannot follow directly without difficulty in viscosity control, it is preferred to lower the concentration. Further, when the concentration of the dispersion A before the thickening step is so low that the thickening step, if follows directly, does not produce much thickening effect, it is preferred to concentrate the dispersion.

When going into to the thickening step, the dispersion A preferably has a solid content of from 3 to 40% (mass ratio) based on the total mass of the dispersion. If the solid content is lower than 3%, increase in the dispersion viscosity due to application of ultrasonic vibration or a shearing force is insufficient, and therefore the resulting dispersion B may not form sufficiently strong membrane. On the other hand, if the solid content is higher than 40%, the dispersion viscosity increases abruptly in the thickening step, and therefore it may be difficult to form the resulting dispersion B into membranes. The solid content is more preferably at most 30%. Further, the solid content is particularly preferably from 7 to 15% because increase in the dispersion viscosity due to application of ultrasonic vibration or a shearing force is moderate, and the resulting dispersion readily forms strong membranes.

Further, in the present invention, the ion exchange polymer dispersion A is preferably obtained by a dispersion step of uniformly dispersing the fluorinated polymer having sulfonic acid groups as an ion exchange polymer in the dispersion medium. The dispersion steps is preferably followed by the filtration step of filtering the dispersion A, the concentration adjusting step of adjusting the concentration of the ion exchange polymer in the filtered dispersion A and the thickening step of increasing the dispersion viscosity by applying ultrasonic vibration or a shearing force to the dispersion A having the concentration adjusted.

In the dispersion step, the temperature of the dispersion medium may be such a temperature that the fluorinated polymer having sulfonic acid groups dissolves or disperses uniformly. When the temperature is higher than the boiling point of the dispersion medium at ordinary pressure, the dispersion step may be carried out under pressure. The dispersing operation is usually carried out while the temperature of the dispersion medium is kept within the range of from room temperature to 270° C., particularly preferably from 60 to 250° C. If the temperature is too low, the fluorinated polymer having sulfonic acid groups is difficult to disperse in the dispersion medium uniformly, or takes long time to disperse uniformly. On the other hand, if the temperature is too high, the concentration of the sulfonic acid groups tends to be low.

The dispersing operation is usually carried out for approximately from one minute to one day, usually with stirring in order to secure uniform dispersion, preferably at a number of rotations of from 30 to 500 rpm. At a number of rotations of less than 30 rpm, uniformity of the dispersion is unfavorably insufficient, and at a number of rotations of more than 500 rpm, an ununiform dispersion unfavorably tends to be obtained, because a shearing force generates so that the viscosity increases partly before achievement of uniform dispersion. Namely, it is difficult to increase the viscosity of the dispersion and disperse the ion exchange polymer at the same time, and therefore the dispersion step and the thickening step do not proceed in parallel in the process of the present invention.

The viscosity of the dispersion B having an increased viscosity after the thickening step is preferably from 1,000 to 100,000 mPa·s at 25° C. at a shear rate of 10 (1/s). If the viscosity is less than 1,000 mPa·s, the dispersion B unfavorably forms insufficiently strong membrane. It is not preferred that the viscosity is more than 100,000 mPa·s, because it is difficult to form membranes. The viscosity is more preferably from 1,500 to 10,000 mPa·s because strong membranes are readily formed.

Further, the viscosity of the dispersion A immediately before application of ultrasonic vibration or a shearing force is preferably from 50 to 10,000 mPa·s at 25° C. at a shear rate of 10 (1/s). If the viscosity is lower than 50 mPa·s, increase in the dispersion viscosity due to application of ultrasonic vibration or a shearing force is insufficient, and therefore the resulting dispersion B may not form sufficiently strong membranes. If the viscosity is higher than 10,000 mPa·s, the viscosity increases further upon application of ultrasonic vibration or a shearing force, and therefore it is difficult to form membranes. The viscosity is preferably from 80 to 2,000 mPa·s because increase in the dispersion viscosity due to application of ultrasonic vibration or a shearing force is moderate, and the resulting dispersion B readily forms strong membranes.

As the fluorinated polymer having sulfonic acid groups in the present invention, a wide variety of known polymers may be used. However, it is preferably a copolymer comprising polymerization units derived from a perfluorovinyl compound represented by the general formula $CF_2=CF(OCF_2CFX)_m-O_p-(CF_2)_nSO_3H$ (wherein X is a fluorine atom or a trifluoromethyl group, m is an integer of from 0 to 3, n is an integer of from 0 to 12, and p is 0 or 1 provided that when n is 0, p is also 0) and polymerization units derived from a perfluoroolefin or a perfluoroalkyl vinyl ether. As the perfluorovinyl compound, for example, the compound represented by any of the following formulae 1 to 4 may be mentioned. In the formulae 1 to 4, q is an integer of from 1 to 9, r is an integer of from 1 to 8, s is an integer of from 0 to 8, and z is 2 or 3.

$$CF_2=CFO(CF_2)_qSO_3H \qquad \text{formula 1}$$

$$CF_2=CFOCF_2CF(CF_3)O(CF_2)_rSO_3H \qquad \text{formula 2}$$

$$CF_2=CF(CF_2)_sSO_3H \qquad \text{formula 3}$$

$$CF_2=CF[OCF_2CF(CF_3)]_zO(CF_2)_2SO_3H \qquad \text{formula 4}$$

The polymer having sulfonic acid groups which comprises polymerization units derived from a perfluorovinyl compound is usually obtained by polymerization of a perfluorovinyl compound having a —SO$_2$F group. The perfluorovinyl compound having a —SO$_2$F group is usually copolymerized with a comonomer such as a perfluoroolefin or a perfluoro(alkyl vinyl ether) due to its small radical polymerization reactivity, though it may be polymerized alone. The perfluoroolefin as a comonomer may, for example, be tetrafluoroethylene, hexafluoropropylene. Usually, the use of tetrafluoroethylene is preferred.

The perfluoro(alkyl vinyl ether) as a comonomer is preferably a compound represented by $CF_2=CF-(OCF_2CFY)_t-O-R^f$ wherein Y is a fluorine atom or a trifluoromethyl group, t is an integer of from 0 to 3, and $R^f$ is a linear or branched perfluoroalkyl group represented by $C_uF_{2u+1}$ ($1 \leq u \leq 12$). Preferable examples of the compound represented by $CF_2=CF-(OCF_2CFY)_t-O-R^f$ include compounds represented by any of the formulae 5 to 7. In the formulae 5 to 7, v is an integer of from 1 to 8, w is an integer of from 1 to 8, and x is an integer of from 1 to 3.

$$CF_2=CFO(CF_2)_vCF_3 \qquad \text{formula 5}$$

$$CF_2=CFOCF_2CF(CF_3)O(CF_2)_wCF_3 \qquad \text{formula 6}$$

$$CF_2=CF[OCF_2CF(CF_3)]_xO(CF_2)_2CF_3 \qquad \text{formula 7}$$

In addition to a perfluoroolefine or a perfluoro(alkyl vinyl ether), other fluorinated monomers such as perfluoro(3-oxa-hepta-1,6-diene) may be copolymerized as a copolymer with the perfluorovinyl compound having —SO$_2$F groups.

The ion exchange polymer dispersion of the present invention is an ion exchange polymer dispersion having a fluorinated polymer having sulfonic acid groups dispersed uniformly in the dispersion medium, and has a viscosity of from 1,000 to 100,000 mPa·s, preferably from 1,500 to 10,000 mPa·s at 25° C. at a shear rate of 10 (1/s). As mentioned above, commercially available ion exchange polymer dispersions have viscosities of approximately 10 mPa·s at 25° C. at a shear rate of 10 (1/s). The viscosity hardly increases when they are merely stirred. The ion exchange polymer dispersion of the present invention is, for example, a dispersion obtained after the above-mentioned thickening step, and has a viscosity within the above-mentioned range. Therefore, when cast into a membrane, it readily forms an ion exchange membrane which is, though thin, free from cracking and has high tensile strength and tear strength.

In the ion exchange polymer dispersion, if the ion exchange polymer consists of polymerization units derived from the perfluorovinyl compound represented by the $CF_2=CF(OCF_2CFX)_m-O_p-(CF_2)_nSO_3H$ and polymerization units derived from tetrafluoroethylene, the dispersion medium preferably contains alcohols.

Then, the process for producing a membrane-electrode assembly for solid polymer electrolyte fuel cells of the present invention will be described. The present invention includes a step of preparing a coating solution containing the ion exchange polymer dispersion B obtained as mentioned above and a catalyst powder comprising catalyst metal particles and a carbon support loaded with the catalyst metal particles, and a step of coating a substrate with the coating solution to form a catalyst layer for at least one of the anode and the cathode. The catalyst layer obtained by the process has few defects such as cracks and is excellently smooth. The catalyst layer is formed by removing the solvent (dispersion medium) after application of the coating solution. Therefore, the ion exchange polymer functions not only as an electrolyte but also as a catalyst binder to make the catalyst layer strong enough to be free from cracking.

To the coating solution, alcohols, fluorinated solvents or water may be added as solvents, and the solvents are specifically exemplified below.

As alcohols, those having $C_{1-4}$ main chains such as methyl alcohol, ethyl alcohol, n-propyl alcohol, isopropyl alcohol and tert-butyl alcohol are preferably used. Further, addition of water to alcohols increases solubility of the ion exchange resin.

Examples of fluorinated solvents are given below.

Hydrofluorocarbons such as 2H-perfluoropropane, 1H, 4H-perfluorobutane, 2H,3H-perfluoropentane, 3H,4H-perfluoro(2-methylpentane), 2H,5H-perfluorohexane and 3H-perfluoro(2-methylpentane).

Fluorocarbons such as perfluoro(1,2-dimethylcyclobutane), perfluoroctane, perfluoroheptane and perfluorohexane.

Hydrochlorofluorocarbons such as 1,1-dichloro-1-fluoroethane, 1,1,1-trifluoro-2,2-dichloroethane, 3,3-dichloro-1,1,1,2,2-pentafluoropropane and 1,3-dichloro-1,1,2,2,3-pentafluoropropane.

Fluoroethers such as 1H,4H,4H-perfluoro(3-oxapentane) and 3-methoxy-1,1,1,2,3,3-hexafluoropropane.

Fluorinated alcohols such as 2,2,2-trifluoroethanol, 2,2,3,3,3-pentafluoro-1-propanol and 1,1,1,3,3,3-hexafluoro-2-propanol.

Further, the solid content of the coating solution may be selected so as to suit the desired thickness of the catalyst layer with no particular restrictions. However, the solid content is preferably from 1 to 50%, particularly preferably from 5 to 35% in terms of the mass ratio to the total mass of the coating solution. If the solid content is too low, formation of a uniform coating layer may be difficult. On the other hand, if the solid content is too high, the coating solution has too high a viscosity to apply evenly.

The substrate to be coated with the coating solution may be an ion exchange membrane, or may be a gas diffusion layer which is to be bonded onto the outer surface of a catalyst layer and functions also as a current collector. Further, the substrate may be an additionally supplied substrate which is not a constituent of a membrane-electrode assembly. In this case, the catalyst layer may be peeled off the substrate after bonded to a membrane. For production of a membrane-electrode assembly, the following processes may be specifically mentioned.

A process which comprises directly applying the coating solution on a solid polymer electrolyte membrane, removing the dispersion medium from the coating solution by drying to form a catalyst layer, and then interposing the catalyst layer between gas diffusion layers. A process which comprises applying the coating solution on a substrate as a gas diffusion layer such as carbon paper, carbon cloth or carbon felt, drying it to form a catalyst layer, and then bonding the catalyst layer by e.g. hot pressing onto a solid polymer electrolyte membrane. A process which comprises applying the coating solution on a film (substrate) which sufficiently resists the solvent in the above coating solution, drying it and hot pressing the resulting layer onto a solid polymer electrolyte membrane, peeling the substrate film, and interposing the layer between gas diffusion layers.

The coating methods is not particularly limited, and specific examples include batch methods such as bar coating, spin-coating and screen printing and continuous methods such as premetered methods and postmetered methods. In a postmetered method, a coating solution is applied in excess, and the excess of the coating solution is removed to a prescribed thickness. In a premetered method, the exact amount of a coating solution required to attain a prescribed thickness is applied.

Postmetered methods include, for example, air doctor coating, blade coating, rod coating, knife coating, squeeze coating, dip coating and comma coating. Premetered methods include, for example, die coating, reverse roll coating, transfer roll coating, gravure coating, kiss-roll coating, cast coating, spray coating, curtain coating, calender coating and extrusion coating. In order to form a uniform catalyst layer, screen printing and die coating are preferred, and considering production efficiency, continuous die coating is preferred.

In the present invention, the catalysts in the catalyst layers for the anode and the cathode may be the same or different, and are preferably metal catalysts comprising platinum or a platinum alloy supported on carbon. Carbon as the support preferably has a specific surface area of from 50 to 1,500 $m^2/g$. If it is within the range, the metal catalysts can be loaded on the carbon support dispersedly and shows stable and excellent activity in the electrode reaction for a long time. Platinum as the metal catalyst preferably shows high activity in the oxidation of hydrogen on the anode and the reduction of oxygen on the cathode in a solid polymer electrolyte fuel cell. Further, use of a platinum alloy may improve the stability or activity of the electrode catalyst.

Such a platinum alloy is preferably an alloy of platinum with at least one metal selected from the group consisting of the metals in the same group as platinum other than platinum (such as ruthenium, rhodium, palladium, osmium and indium), gold, silver, chromium, iron, titanium, manganese, cobalt, nickel, molybdenum, tungsten, aluminum, silica, zinc and tin. The platinum alloy may include an intermetallic compound of platinum and a metal which can form an alloy with platinum. Especially, when a gas containing carbon monoxide is supplied to the anode, an alloy containing platinum and ruthenium is preferably used because the catalyst activity stabilizes.

The ion exchange membrane obtained by using the ion exchange polymer dispersion obtained by the method of the present invention can be used as a polymer electrolyte membrane in a solid polymer electrolyte fuel cell. The membrane of the membrane-electrode assembly obtained by the process for producing a membrane-electrode assembly of the present invention may be prepared by using the ion exchange polymer dispersion or may be prepared by other methods.

There is no particularly restriction on the thickness of the catalyst layer and the polymer electrolyte membrane in the membrane-electrode assembly. However, the thickness of the polymer electrolyte membrane is preferably at most 50 μm. If the polymer electrolyte membrane is thicker than 50 μm, the polymer electrolyte membrane between the anode and the cathode tends to be dry due to the small steam concentration gradient in the membrane. A dry polymer electrolyte membrane having low proton conductivity can lower the cell performance. Though the thinner the polymer electrolyte membrane is, the better from the above-mentioned point of view, an excessively thin polymer electrolyte membrane can make a short-circuit. Therefore, the thickness is more preferably from 3 to 40 μm, particularly from 5 to 30 μm.

The catalyst layer is preferably at most 20 μm thick, to facilitate the gas diffusion through the catalyst layer and improve the cell characteristics, and is also preferred to be uniform and smooth. The process of the present invention can afford a catalyst layer with a uniform thickness of even 20 μm or less. Reduction in the thickness of the catalyst layer can lower the reaction activity because a thinner catalyst layer can bear a smaller amount of a catalyst per unit area. The use of a supported catalyst containing platinum or a platinum alloy in a high ratio as the catalyst makes it possible to keep the reaction activity high while reducing the thickness of the catalyst layer without shortage of the catalyst. From the above-mentioned point of view, the thickness of the catalyst layer is particularly preferably from 1 to 15 μm.

In the membrane-electrode assembly for electrolyte fuel cells of the present invention, the cathode is supplied with an oxygen-containing gas, while the anode is supplied with a hydrogen-containing gas. Particularly, each electrode of the membrane-electrode assembly may, for example, have a separator having grooves as the gas channels on the outer surface, and the membrane-electrode assembly is supplied with the gas as a fuel flowing in through the gas channels when the cell is in operation. Further, the membrane-electrode assembly of the present invention can be used as a membrane-electrode assembly for a direct methanol fuel cell with a supply of methanol as the fuel gas.

Now, the present invention will be described in further detail with reference to Examples and Comparative Examples, but it should be understood that the present invention is by no means restricted thereto.

EXAMPLE 1

Example 5,000 g of a powdery copolymer consisting of polymerization units derived from tetrafluoroethylene and polymerization units derived from $CF_2=CF—OCF_2CF(CF_3)O(CF_2)_2SO_2F$ (with an ion exchange capacity of 1.1 meq/g dry resin) was hydrolyzed in a mixture of 20,000 g of 10% aqueous potassium hydroxide (solid content mass based on the liquid mass. Hereinafter, "%" consistently indicates a concentration in terms of mass ratio.) and 5,000 g of methanol, and after washing with water, 0.5 hour of immersion in 20 L of 1.5 mol/L sulfuric acid at room temperature and drainage were repeated seven times for conversion into the acid form (sulfonic acid groups). The copolymer was washed with water again and dried to obtain 4,960 g of a sulfonic acid group-containing polymer.

3,000 g of the resulting polymer was dispersed in 27,000 g of ethanol with stirring at 80° C. for 16 hours, and then the dispersion was filtered through a filter having a pore diameter of 3 μm to obtain 29,500 g of an ion exchange polymer dispersion (hereinafter referred to as polymer dispersion a) having a solid content of 10%. The viscosity was measured at 25° C. by using an automatic viscometer RC550 manufactured by Toki Sangyo Co., Ltd. and was found to be 500 mPa·s at a shear rate of 10 (1/s).

1,000 g of the polymer dispersion a was sonicated for 30 minutes at 50° C. at a circulation rate of 100 ml/min with an ultrasonic generator equipped with a continuous circulator (tip diameter: 36 mmΦ, the volume of the ultrasonic chamber: 40 ml, 600 W) manufactured by Nippon Seiki Co., LTD. to give 0.3 kWh of energy to the polymer dispersion a. The viscosity of the resulting polymer dispersion was 1,800 mPa·s at a shear rate of 10 (1/s).

This polymer dispersion was cast on a polyethylene terephthalate (PET) film with a silicone releasant-treated surface through a die coater, and dried at 80° C. for 5 minutes to form a 30 μm-thick ion exchange membrane.

The tensile strength of the resulting ion exchange membrane was measured by the method stipulated in JIS-K7127. Specifically, the ion exchange film was cut into the shape of test specimens No. 1 and measured at 25° C. and 50% RH. The tensile strength was 10 MPa, and the elongation at break was 16%. Further, the tear strength was measured by the method stipulated in JIS-K7128-1, as follows. Strip specimens of 5 cm in width and 15 cm in length were cut from the membrane so that the tear strength would be measured in the longitudinal direction. A longitudinal cut was made in each sample over 7.5 cm, i.e., half the length of 15 cm, from the center of a short edge to provide it with two legs of equal width. The end of one leg was fixed to the upper chuck of a tester, and the end of the other to the lower chuck to tear the specimen from the crotch. The tearing load was measured while the distance between the chucks was increased at 25° C. and 50% RH. The tear strength (N/mm) was calculated by dividing the tearing load by the thickness of the sample. Five samples were measured in each direction and averaged out at a tear strength of 0.7 N/mm.

Then, 360 g of the resulting polymer dispersion, 75 g of a carbon-supported platinum catalyst having a platinum ratio of 55%, 70 g of ethanol and 600 g of water were mixed to give a coating solution. This coating solution was cast on a polyethylene terephthalate (PET) film with a silicon releasant-treated surface through a die coater and dried at 80° C. for 20 minutes to obtain a catalyst layer containing platinum in an amount of 0.5 mg/cm² per unit area. There were no defects such as cracks in the catalyst layer.

This catalyst layer was put on each side of an ion exchange membrane (with an ion exchange capacity of 1.1 meq/g and a thickness of 50 μm; product name: Flemion, Asahi Glass Company, Ltd.), bonded by hot pressing at 130° C. and 0.3 MPa for 3 minutes and then peeled off the PET film to obtain a membrane-catalyst layer assembly. Further, carbon cloths were put as gas diffusion layers on both sides to obtain a membrane-electrode assembly. Further, carbon plates having narrow grooves as gas channels cut in zigzags are put on both sides as separators. And then heaters are put onto the outer surface to assemble a solid polymer electrolyte fuel cell having an effective membrane surface area of 25 cm².

When air is supplied to the cathode, and hydrogen is supplied to the anode at 0.15 MPa, respectively, at a constant fuel cell temperature of 80° C., the cell voltage is 0.79 V at a current density of 0.1 A/cm² and 0.58 V at a current density of 1 A/cm².

EXAMPLE 2

Example 200 g of the polymer dispersion a was treated in a beaker with a homogenizer (product name: Polytron Homogenizer Model K, manufactured by Kinematica) for 1 minute at 25,000 rpm. The temperature was initially 25° C. and rose to from 50 to 60° C. after the treatment was started. The peripheral speed was about 9.8 m/sec, and the clearance was about 30 μm. Therefore, a shearing force was applied to the dispersion at a shear rate of $3.3 \times 10^5$ (1/s), and the shearing energy given thereto was calculated at 1.7×10$^5$ J per 1 kg of unit mass of the dispersion. The viscosity of the resulting polymer dispersion was 3,000 mPa·s at 25° C. at a shear rate of 10 (1/s).

This polymer dispersion was cast on a PET film with a silicone releasant-treated surface through a die coater and then dried at 80° C. for 5 minutes to form a 30 μm-thick ion exchange membrane.

The tensile strength and the tear strength of the resulting ion exchange membrane were measured in the same manner as in Example 1. The tensile strength was 11 MPa, the elongation after break was 15%, and the tear strength was 0.8 N/mm.

A catalyst layer was prepared in the same manner as in Example 1 by using the above polymer dispersion, and there were no defects such as cracks. Further, a membrane-electrode assembly is prepared in the same manner as in Example 1 and is evaluated in the same manner as in Example 1. The cell voltage is found to be 0.80 V at a current density of 0.1 A/cm$^2$ and 0.57 V at a current density of 1 A/cm$^2$.

EXAMPLE 3

Example 2,000 g of the polymer dispersion a was treated four times with a grinder (product name: MYCOLLOIDER Model M manufactured by Tokushu Kika Kogyo Co., LTD., grinding area: 2.4×10$^{-3}$ m$^2$) at 5,000 rpm with a clearance of 30 μm. The temperature was initially 25° C. and rose to from 50 to 60° C. after the treatment was started. One treatment took four minutes, and the retention time per 1,000 g was 120 s. The peripheral speed was about 13.1 m/sec, and the clearance was 30 μm. Therefore, a shear was applied at a shear rate of 4.4×10$^5$ (1/s), and the shearing energy per 1 kg of unit mass of the dispersion was calculated at 3.3×10$^6$ J. Further, the viscosity of the resulting polymer dispersion was 6,000 mPa·s at a shear rate of 10 (1/s).

This polymer dispersion was cast on a PET film with a silicone releasant-treated surface through a die coater and dried at 80° C. for 30 minutes to form a 30 μm-thick ion exchange membrane.

The tensile strength and the tear strength of the resulting ion exchange membrane were measured in the same manner as in Example 1, and the tensile strength was 13 MPa, the elongation at break was 20%, and the tear strength was 0.9 N/mm.

A catalyst layer was prepared in the same manner as in Example 1 by using the polymer dispersion, and there were no defects such as cracks in the catalyst layer. Further, a membrane-electrode assembly is prepared in the same manner as in Example 1 and is evaluated in the same manner as in Example 1. The cell voltage is 0.79 V at a current density of 0.1 A/cm$^2$ and 0.60 V at a current density of 1 A/cm$^2$.

EXAMPLE 4

Example 2,000 g of the polymer dispersion a was treated with a high pressure emulsifier (Type NS1001L2K, manufactured by NIRO SOAVI S.B.A.) at a flow rate of 10 L/min at a pressure of 120 MPa. The temperature was initially 25° C. and rose to from 50 to 60° C. after the treatment was started. The viscosity of the resulting polymer dispersion was 3,000 mPa·s at 25° C. at a shear rate of 10 (1/s).

This polymer dispersion is cast on a PET film with a silicone releasant-treated surface through a die coater and dries at 80° C. for 30 minutes to form a 30 μm-thick ion exchange membrane. The tensile strength and the tear strength of this ion exchange membrane are measured in the same manner as in Example 1. The tensile strength is 11 MPa, the elongation at break is 20%, and the tear strength is 0.7 N/mm.

A catalyst layer was prepared in the same manner as in Example 1 by using the polymer dispersion, and there were no defects such as cracks in the catalyst layer. Further, a membrane-electrode assembly is prepared in the same manner as in Example 1 and is evaluated in the same manner as in Example 1. The cell voltage is 0.77 V at a the current density of 0.1 A/cm$^2$ and 0.59 V at a the current density of 1 A/cm$^2$.

EXAMPLE 5

Example 3,000 g of a sulfonic acid group-containing ion exchange polymer obtained in the same manner as in Example 1 was dispersed in 12,000 g of a mixed solvent of ethanol/water=70/30 (mass ratio) with stirring for 16 hours. Then, this dispersion was filtered through a filter having a pore diameter of 3 μm to obtain 14,700 g of an ion exchange polymer dispersion (hereinafter referred to as polymer dispersion b) having a solid content of 20%. The viscosity of the polymer dispersion b was measured in the same manner as in Example 1 and was found to be 200 mPa·s at a shear rate of 10 (1/s).

2,000 g of the polymer dispersion b was treated four times with the same grinder as used in Example 3 at 5,000 rpm with a clearance of 30 μm. The temperature was initially 25° C. and rose to from 40 to 50° C. after the treatment was started. One treatment took two minutes, and the retention time per 1,000 g was 60 seconds. The peripheral speed was approximately 13.1 m/s, and the clearance was 30 μm. Therefore, a shear was applied at a shear rate of 4.4×10$^5$ (1/s), and the shear energy per 1 kg of unit mass of the dispersion was calculated at 6.6×10$^6$ J. The viscosity of the resulting polymer dispersion was 3,000 mPa·s at a shear rate of 10 (1/s).

This polymer dispersion is cast on a PET film with a silicone releasant-treated surface through a die coater and dried at 80° C. for 5 minutes to form a 30 μm-thick ion exchange membrane. The tensile strength and the tear strength of the ion exchange membrane are measured in the same manner as in Example 1. The tensile strength is 12 MPa, the elongation at break is 16%, and the tear strength is 0.7 N/mm.

A catalyst layer was prepared in the same manner as in Example 1 by using the polymer dispersion, and there were no defects such as cracks in the catalyst layer. Further, a membrane-electrode assembly is prepared in the same manner as in Example 1 and is evaluated in the same manner as in Example 1. The cell voltage is 0.80 V at a current density of 0.1 A/cm$^2$ and 0.61 V at a current density of 1 A/cm$^2$.

EXAMPLE 6

Comparative Example

The polymer dispersion a was cast on a PET film with a silicone releasant-treated surface through a die coater without any treatment and dried at 80° C. for 5 minutes to form a 30 μm-thick ion exchange membrane.

The tensile strength and the tear strength of the resulting ion exchange membrane were measured in the same manner as in Example 1. The tensile strength was 6 MPa, the elongation at break was 5%, and the tear strength was 0.2 N/mm.

A catalyst layer was prepared in the same manner as in Example 1 by using the polymer dispersion, and there was a crack in the catalyst layer. Further, a membrane-electrode assembly is prepared in the same manner as in Example 1 and is evaluated in the same manner as in Example 1. The cell voltage is 0.78 V at a current density of 0.1 A/cm² and 0.58 V at a current density of 1 A/cm².

EXAMPLE 7

Comparative Example

The polymer dispersion b was cast on a PET film with a silicone releasant-treated surface through a die coater without any treatment and dried at 80° C. for 5 minutes to form a 30 μm-thick ion exchange membrane.

The tensile strength and the tear strength of the resulting ion exchange membrane were measured. The tensile strength was 5 MPa, the elongation at break was 4%, and the tear strength was 0.2 N/mm.

A catalyst layer was prepared in the same manner as in Example 1 by using the above polymer dispersion, and there was a crack in the catalyst layer. Further, a membrane-electrode assembly is prepared in the same manner as in Example 1 and is evaluated in the same manner as in Example 1. The cell voltage is 0.77 V at a current density of 0.1 A/cm² and 0.57 V at a current density of 1 A/cm².

EXAMPLE 8

Comparative Example 1,000 g of the polymer dispersion a was put in 2 L of an autoclave having an inner diameter of 200 mmΦ, an anchor blade was mounted therein, and the dispersion was stirred at 100 rpm for 2 hours. The radius of the anchor blade was 60 mm, and the clearance between the anchor blade and the wall was 40 mm. Therefore, the shear rate was calculated at 15.7 (1/s). The viscosities before and after stirring were measured, and the viscosity at a shear rate of 10 (1/s) was 500 mPa·s before stirring and 510 mPa·s after stirring.

INDUSTRIAL APPLICABILITY

The ion exchange polymer dispersion of the present invention can form a then ion exchange membrane with high tear strength. Further, a catalyst layer prepared by using this ion exchange polymer dispersion has few defects such as cracks, and is excellently smooth. A solid polymer fuel cell using an ion exchange membrane or a catalyst layer obtained from the ion exchange polymer dispersion of the present invention as a membrane-electrode assembly is excellent in output characteristics and durability.

The entire disclosure of Japanese Patent Application No. 2002-198931 filed on Jul. 8, 2002 including specification, claims and summary is incorporated herein by reference in its entirety.

What is claimed is:

1. A process for preparing an ion exchange polymer dispersion comprising:
   preparing a uniform dispersion of an ion exchange polymer having an initial viscosity;
   filtering the uniform dispersion of an ion exchange polymer having an initial viscosity wherein coarse particles are removed from the uniform dispersion of an ion exchange polymer having an initial viscosity; and
   applying either an ultrasonic vibration or a shearing force to the uniform dispersion of an ion exchange polymer to increase the viscosity to 2-2000 times the initial viscosity;
   wherein
   the filtering the uniform dispersion comprises filtering through a filter having a pore diameter of from 0.5 to 30 μm,
   the uniform dispersion of an ion exchange polymer comprises a monohydric or a polyhydric alcohol,
   the ion exchange polymer is a fluorinated polymer comprising sulfonic acid groups; and
   the viscosity is measured at 25° C. at a shear rate of 10 (1/s), and wherein
   if ultrasonic vibration is applied, a power of 30 to 2,000 W is applied to the uniform dispersion of an ion exchange polymer in the ultrasonic vibration, or
   if the shearing force is applied to the uniform dispersion of an ion exchange polymer, the shearing force is in the range of 1,000 to 50,000 rpm.

2. The process for preparing an ion exchange polymer dispersion according to claim 1, wherein the applying ultrasonic vibration comprises imparting energy in an amount from 0.01 to 10 kWh per 1 kg of unit mass of the uniform dispersion of an ion exchange polymer having an initial viscosity.

3. The process for preparing an ion exchange polymer dispersion according to claim 1, wherein the applying shearing force comprises applying a shearing force at a shear rate of from $10^2$ to $10^8$ 1/s.

4. The process for preparing an ion exchange polymer dispersion according to claim 3, wherein the applying shearing force comprises imparting energy in an amount from $10^3$ to $10^8$ J per 1 kg of unit mass of the uniform dispersion of an ion exchange polymer having an initial viscosity.

5. The process for preparing an ion exchange polymer dispersion according to claim 1 further comprising adjusting the concentration of the uniform dispersion of an ion exchange polymer having an initial viscosity to from 3 to 40% in terms of mass ratio to the total mass before the applying the ultrasonic vibration or shearing force.

6. The process for preparing an ion exchange polymer dispersion according to claim 1 wherein the initial viscosity is from 50 to 10000 mPa·s and the viscosity 2-2000 times the initial viscosity is from 1000 to 100000 mPa·s at 25° C. and a shear rate of 10 1/s.

7. The process for preparing an ion exchange polymer dispersion according to claim 5, wherein a solid content of the uniform dispersion of an ion exchange polymer at a viscosity 2-2000 times the initial viscosity is 3 to 40% in terms of the mass ratio to the total mass.

8. The process for preparing an ion exchange polymer dispersion according to claim 1, wherein the fluorinated polymer is a copolymer comprising polymerization units derived from tetrafluoroethylene and polymerization units derived from $CF_2=CF(OCF_2CFX)_m—O_p—(CF_2)_nSO_3H$, wherein X is a fluorine atom or a trifluoromethyl group, m is an integer of from 0 to 3, n is an integer of from 0 to 12, and p is 0 or 1, provided that when n is 0, p is also 0.

9. The process for preparing an ion exchange polymer dispersion according to claim 5 wherein the initial viscosity is from 50 to 10000 mPa·s and the viscosity 2-2000 times the initial viscosity is from 1000 to 100000 mPa·s at 25° C. and a shear rate of 10 1/s.

* * * * *